(12) United States Patent
Ji et al.

(10) Patent No.: US 9,577,801 B2
(45) Date of Patent: Feb. 21, 2017

(54) UPLINK TRANSMISSION METHOD AND APPARATUS IN INTER-ENB INTER-DUPLEX CARRIER AGGREGATION SYSTEM

(71) Applicant: Samsung Electronics Co., Ltd., Gyeonggi-do (KR)

(72) Inventors: Hyoungju Ji, Seoul (KR); Joonyoung Cho, Gyeonggi-do (KR); Youngbum Kim, Seoul (KR); Sangmin Ro, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 188 days.

(21) Appl. No.: 14/020,312

(22) Filed: Sep. 6, 2013

(65) Prior Publication Data

US 2014/0071862 A1 Mar. 13, 2014

(30) Foreign Application Priority Data

Sep. 7, 2012 (KR) .......................... 10-2012-0099333

(51) Int. Cl.
*H04J 3/00* (2006.01)
*H04L 5/00* (2006.01)
*H04L 5/14* (2006.01)

(52) U.S. Cl.
CPC ............ *H04L 5/0037* (2013.01); *H04L 5/001* (2013.01); *H04L 5/0053* (2013.01); *H04L 5/0055* (2013.01); *H04L 5/1469* (2013.01)

(58) Field of Classification Search
None
See application file for complete search history.

(56) References Cited

U.S. PATENT DOCUMENTS

| | | | |
|---|---|---|---|
| 2006/0126546 A1* | 6/2006 | Lee | H04B 7/2615 370/310 |
| 2008/0219236 A1* | 9/2008 | Love et al. | 370/347 |
| 2011/0013576 A1* | 1/2011 | Hsu | 370/329 |
| 2011/0222491 A1 | 9/2011 | Vajapeyam et al. | |
| 2012/0127954 A1* | 5/2012 | Lim et al. | 370/330 |
| 2012/0178482 A1* | 7/2012 | Seo et al. | 455/501 |
| 2012/0213189 A1* | 8/2012 | Choi | H04W 72/1231 370/329 |
| 2013/0079049 A1* | 3/2013 | Yu et al. | 455/524 |
| 2013/0083710 A1* | 4/2013 | Chen et al. | 370/281 |
| 2013/0170468 A1* | 7/2013 | Baker et al. | 370/330 |

(Continued)

FOREIGN PATENT DOCUMENTS

| | | |
|---|---|---|
| EP | 2 445 132 | 4/2012 |
| KR | 1020110088765 | 8/2011 |
| WO | WO 2010/006114 | 1/2010 |

OTHER PUBLICATIONS

Yang Lu et al., "Uplink Control for Low Latency HARQ in TDD Carrier Aggregation", 2012 IEEE Vehicular Technology Conference (VTC Spring), May 6-9, 2012.

*Primary Examiner* — Otis L Thompson, Jr.
(74) *Attorney, Agent, or Firm* — The Farrell Law Firm, P.C.

(57) ABSTRACT

A method and apparatus are provided for transmitting uplink signals including feedback for use in scheduling at different evolved Node Bs (eNBs) without intermodulation interference, especially in cases where the User Equipment (UE) is connected to an inter-duplex inter-eNB system in which the cooperation between eNBs is very slow or non-existent.

15 Claims, 11 Drawing Sheets

(56) References Cited

U.S. PATENT DOCUMENTS

| | | | |
|---|---|---|---|
| 2013/0201966 A1* | 8/2013 | Weng | H04W 72/04 370/336 |
| 2013/0223258 A1* | 8/2013 | Seo et al. | 370/252 |
| 2014/0010125 A1* | 1/2014 | Tillman | H04B 7/2643 370/280 |
| 2014/0126556 A1* | 5/2014 | Tiirola | H04L 47/827 370/336 |
| 2014/0187243 A1* | 7/2014 | Rune et al. | 455/436 |
| 2014/0198680 A1* | 7/2014 | Siomina et al. | 370/252 |

* cited by examiner

UPLINK TRANSMISSION METHOD AND APPARATUS IN INTER-ENB INTER-DUPLEX CARRIER AGGREGATION SYSTEM

PRIORITY

This application claims priority under 35 U.S.C. §119(e) to a Korean Patent Application filed on Sep. 7, 2012 in the Korean Intellectual Property Office and assigned Serial No. 10-2012-0099333, the entire disclosure of which is incorporated herein by reference.

BACKGROUND

1. Field of the Invention

The present invention generally relates to an uplink transmission method and apparatus in an inter-evolved Node B (eNB) inter-duplex carrier aggregation system and, more particularly, to a method and apparatus for transmitting uplink signals including feedback for use in scheduling at different eNBs without intermodulation especially when the User Equipment (UE) is connected to an inter-duplex inter-eNB system where the eNBs are cooperating very slowly.

2. Description of the Related Art

Mobile communication systems have been developed in order to provide subscribers with voice communication services on the move. With the rapid advance of technology, mobile communication systems have evolved to support high speed data communication services as well as standard voice communication services. However, the limited resources and user requirements for higher speed services in current mobile communication systems have spurred the evolution to more advanced mobile communication systems.

In order to meet such requirements, the 3$^{rd}$ Generation Partnership Project (3GPP) is standardizing Long Term Evolution-Advanced (LTE-A) as one of the next generation mobile communication technologies. LTE-A is a high speed packet-based communication technology which offers up to 1 Gbps in downlink. In order to accomplish this, several schemes are being discussed: one increases the number of eNBs and another uses multiple frequency bands per UE.

When the UE connects to more than one eNB, if cooperation among the eNBs is delayed, it is necessary for the UE to transmit feedback for use in scheduling at each of the respective eNBs rather than one representative eNB. When two eNBs to which the UE has connected operate on different frequency bands in different duplex configurations, the UE has to perform uplink transmission to the different eNBs, and this may cause inter-modulation problems.

There is therefore a need for a method and apparatus for transmitting uplink signals to eNBs operating on different frequency bands without causing inter-modulation problems.

SUMMARY

The present invention addresses at least the problems discussed above and provides at least the advantages discussed below. According to one aspect of the present invention, a method and apparatus is provided for transmitting uplink signals including feedback for use in scheduling at distinct eNBs without intermodulation interference between the eNBs, especially in an inter-duplex inter-eNB carrier aggregation system which have eNBs that are slow in cooperation. In accordance with an embodiment of the present invention, a method for a terminal to transmit uplink channels in a wireless communication system includes receiving information on first and second resources for uplink channel scheduling from at least one base station among a plurality of base stations; receiving a first downlink channel for scheduling on the first resource and a second downlink channel for scheduling on the second resource; and transmitting an uplink channel corresponding to the first downlink channel on the first resource and another uplink channel corresponding to the second downlink channel on the second resource, wherein a subframe of the first resource and a subframe of the second resource do not overlap in time. In accordance with another aspect of the present invention, a terminal for transmitting an uplink channel to a base station in a wireless communication system includes a transceiver configured to transmit and receive signals to and from a plurality of base stations; and a controller configured to control reception of information on first and second resources from one of the plurality of base stations, to receive a first downlink channel for scheduling on the first resource and a second downlink channel for scheduling on the second resource, and to transmit an uplink channel corresponding to the first downlink channel on a first resource and another uplink channel corresponding to the second downlink channel on a second resource, wherein a subframe of the first resource and a subframe of the second resource do not overlap in time.

BRIEF DESCRIPTION OF THE DRAWINGS

The above aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
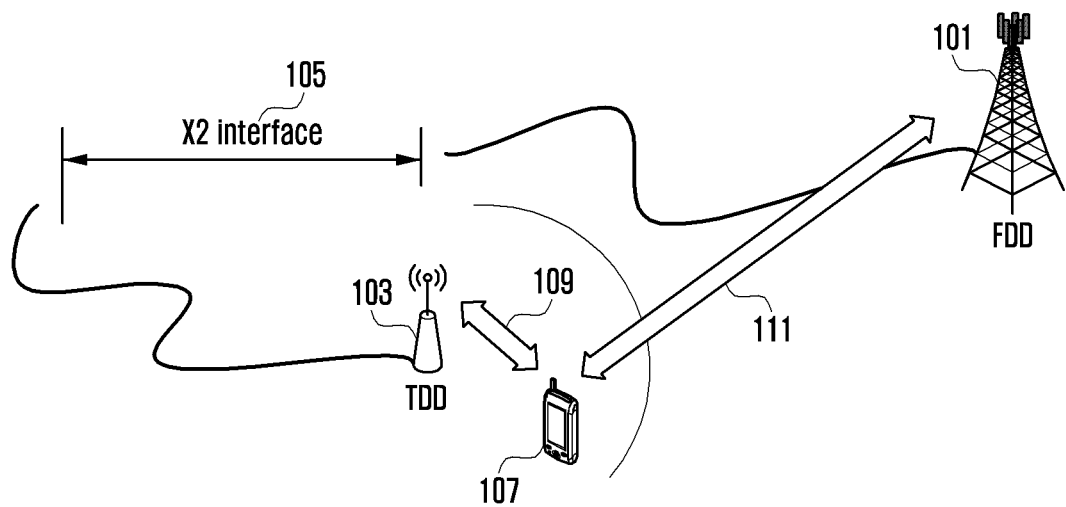
FIG. 1 is a diagram illustrating inter-duplex inter-eNB carrier aggregation in a communication system.

Embodiments of the present invention are described in detail with reference to the accompanying drawings.

Detailed descriptions of well-known functions and structures incorporated herein may be omitted to avoid obscuring the subject matter of the present invention. Further, terms are defined herein in consideration of the functionality in regards to the present invention, and may vary according to the intention of a user or an operator, usage, embodiment, etc. Therefore, the definition of any term herein should be understood on the basis of the overall content of the present application.

Although the description is directed to the Long Term Evolution (LTE) system and LTE-Advanced (LTE-A) system, the present invention may be applied to a variety of other communication systems adopting base station scheduling with or without any modification.

Orthogonal Frequency Division Multiplexing (OFDM) is a technique for transmitting data using multiple carriers by parallelizing a serial input stream into parallel data streams and modulating the parallel data streams onto multiple orthogonal carriers, i.e. sub-carrier channels.

In OFDM systems, the modulation signal is mapped to a 2-dimensional resource, i.e. the time-frequency resource. The time resource is divided into OFDM symbols. The frequency resource is divided into tones orthogonal to each other. In an OFDM system, the minimum resource unit is Resource Element (RE) which is defined by an OFDM symbol on the time axis and by a tone on the frequency axis. Although they experience different frequency selective channel fading, the signals mapped to the orthogonal REs can be received at the receiver without interference from each other.

The physical channel is a physical layer channel for transmitting symbol output by modulating one or more coded bit streams. In an Orthogonal Frequency Division Multiple Access (OFDMA) system, multiple physical channels can be configured according to the purpose of the information bit stream or the receiver. The rule of pairing the physical channel with an RE is referred to as mapping.

In the OFDM system, the downlink bandwidth is divided into a plurality of Resource Blocks (RBs) and each Physical Resource Block (PRP) consists of 12 subcarriers in the frequency domain or axis and 14 or 12 OFDM symbols in the time domain or axis. Here, the PRB is a basic unit for resource allocation.

The Reference Signal (RS) is the signal transmitted by the eNB for use in UE's channel estimation, and the LTE communication system uses a Common Reference Signal (CRS) and a DeModulation Reference Signal (DMRS) as dedicated reference signals.

CRS is transmitted across the entire downlink bandwidth such that all UEs can receive CRS for use in channel estimation, feedback information configuration, and control and data channel demodulation. DMRS is also transmitted across the entire downlink bandwidth for use in UE-specific data channel demodulation and channel estimation, but, unlike CRS, DMRS is not for use in feedback information configuration. Accordingly, DMRS is transmitted on the PRB resource for scheduling UE.

On the time axis, a subframe consists of two slots of 0.5 msec, i.e. first and second slots. The Physical Downlink Control Channel (PDCCH) carried in the control region and the enhanced PDCCH (ePDCCH) carried in the data region are transmitted in a time-division manner in order to receive and demodulate the control channel with priority. The PDCCH region is also arranged across the entire downlink bandwidth in a structure where a control channel is divided into small unit control channels distributed across the entire downlink bandwidth.

The uplink physical channels are classified into Physical Uplink Control Channel (PUCCH) and Physical Uplink Shared Channel (PUSCH), and the acknowledgement channel corresponding to downlink data channel and other feedback information are transmitted, if the data channel exists, on the control channel and, otherwise, on the data channel.

FIG. 1 is a diagram illustrating inter-duplex inter-eNB carrier aggregation in a communication system. That is, FIG. 1 shows an inter-eNB frequency carrier aggregation mechanism according to an embodiment of the present invention.

Referring to FIG. 1 the macro eNB 101 is installed to operate with relatively high transmit power to secure broad coverage. In order to use additional bandwidth, a pico eNB 103 operating with relatively low transmit power is installed. In this case, the pico eNB 103 uses a frequency different from that of the macro eNB 101.

The UE 107 may operate on both of the two different frequency bands. That is, although the two cells operate on different frequency bands, the UE 107 communicates with both the pico eNB 103 and macro eNB 101 on their distinct frequency bands.

Although the legacy system supports fast communication between a single pico eNB 103 and a macro eNB 101 through the X2 interface, if the environment includes plural pico cells, it makes it impossible or slow for the eNBs to communicate. At this time, the network may communicate with the UE via different eNBs operating on different frequency bands to improve the performance of the specific terminal; however, it is difficult for one eNB to perform scheduling on the frequency band of other eNBs. When the X2 interface 105 is not provided, each eNB has to perform scheduling separately on the frequency bands used by the UE.

Regarding feedback, in the legacy system where the feedback is transmitted to only one eNB, if one eNB 101 has received the control channel information, it has to send the control channel information to the other eNB 103 through the X2 interface 105. When plural pico cells exist, however, the X2 interface communication is impossible or very slow and thus the UE 107 has to transmit uplink channels 109 and 111 separately.

Figure 2:
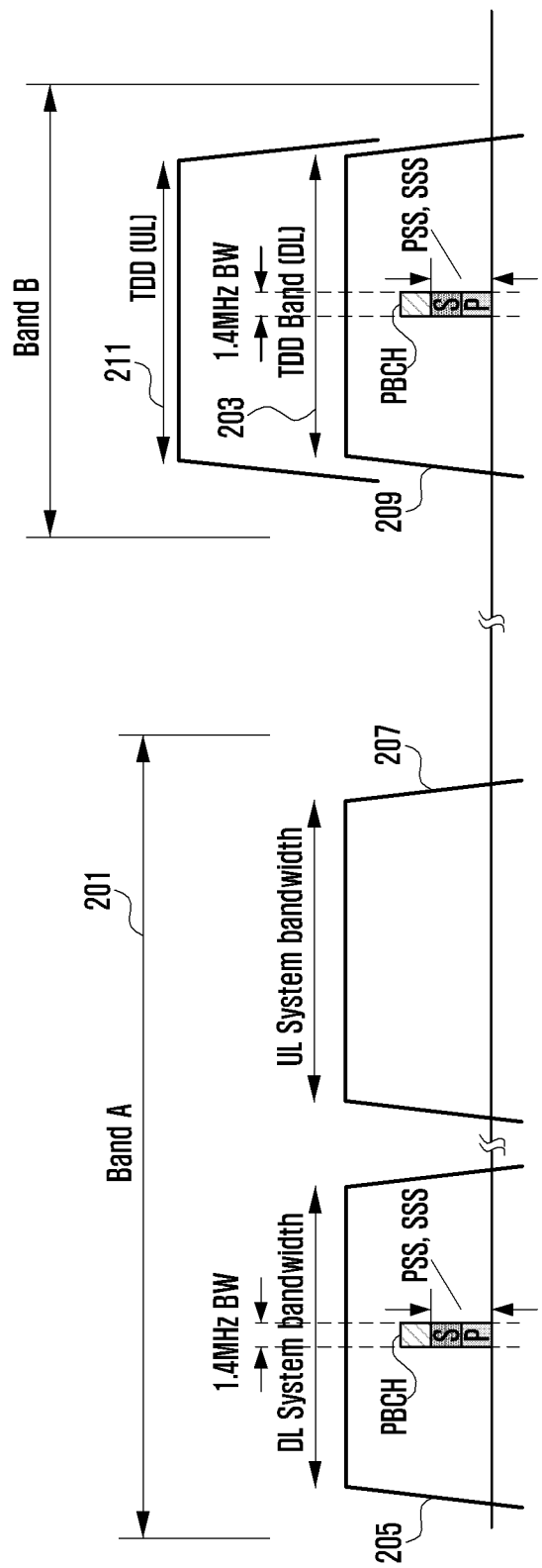
FIG. 2 is a diagram illustrating the frequency bands on which the UE in FIG. 1 is operating.

FIG. 2 is a diagram illustrating frequency bands on which the UE in FIG. 1 is operating.

Referring to FIG. 2, if the UE connects to two eNBs operating on different frequency bands, the frequency bands may be configured as shown in FIG. 2. In this case, the macro eNB 101 uses frequency band A 201 and operates using Frequency Division Duplexing (FDD) with a downlink band 205 and an uplink band 207. Meanwhile, the pico eNB 103 operates using Time Division Duplexing (TDD) in frequency band B 203 including divided downlink band 209 and uplink band 211.

Here, the UE receives downlink control and data channel on the frequency bands 205 and 209 and transmits uplink channels on the frequency bands 207 and 211. That is, the pico eNB 103 transmits downlink data 209 and receives uplink data 211 at different times on the same frequency band B 203. This is depicted on the time axis as shown in FIG. 3.

Figure 3:
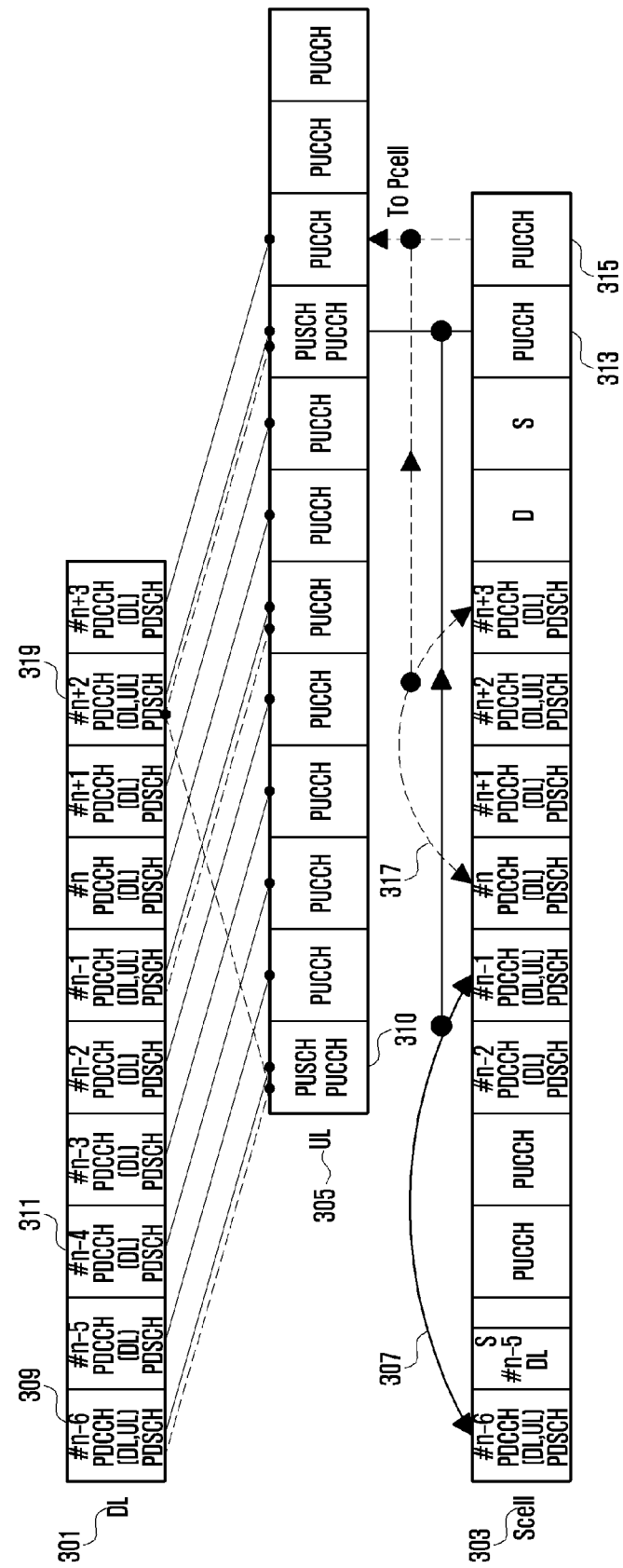
FIG. 3 is a diagram illustrating a downlink-uplink configuration for use in a carrier aggregation communication system to which an embodiment of the present invention is applied.

FIG. 3 is a diagram illustrating a downlink-uplink configuration for use in a carrier aggregation communication system to which an embodiment of the present invention is applied. That is, FIG. 3 shows the configuration of the signals transmitted in uplink and downlink especially when the UE uses multiple bands of different cells in a system supporting carrier aggregation.

Referring to FIG. 3, the macro eNB 101 operates with a downlink band 301 and an uplink band 305, and the pico eNB 103 operates with a downlink and uplink band 303. UE 107 receives the control channel for downlink and uplink data channel transmission at downlink subframes on the frequency bands 301 and 303. The UE 107 transmits uplink data channel at uplink subframes of the frequency bands 305 and 303 as scheduled and uplink acknowledgement channel corresponding to downlink data channel on the band predetermined as Primary Cell (PCell) between the bands 305 and 307.

In the inter-duplex inter eNB carrier aggregation system, it is typical that the macro eNB 101 operates in FDD and the pico eNB 103 in TDD, and the following description is directed to this case. However, the present invention is not limited thereto but may be embodied with the pico eNB 103 operating in FDD and the macro eNB 101 operating in TDD.

Typically, cells are classified into Primary cells (PCells) and Secondary cells (SCells) and, if an eNB manages at least two cells, the network designates one of the cells as the PCell to which the uplink control channel is transmitted and the others as the SCells.

When the macro eNB 101 transmits the control channels for the downlink data channel and uplink data channel at downlink subframe 309, the UE 107 receives the downlink data channel at the same downlink subframe 309. UE 107 transmits uplink data channel at the subframe 310, four subframes after the downlink subframe 309 at which the control channel has been received. The uplink data channel transmission timing is determined in consideration of control channel demodulation and data channel generation time. The downlink acknowledgement channel corresponding to the uplink data channel is transmitted at the subframe 319, four subframes after the subframe 310 at which the uplink data channel has been transmitted. The downlink response channel transmission timing is also determined in consideration of uplink data channel demodulation time.

When the control channel for the downlink data channel is transmitted on the other frequency band 303 too, the UE 107 has to transmit uplink data channel on the other frequency band 303 as denoted by reference numbers 313 and 317.

That is, the uplink acknowledgement channel corresponding to the downlink data channel may be generated as the control channel corresponding to the downlink data channel on at least one of the downlink bands 301 and 303, and the uplink acknowledgement channel has to be transmitted on the uplink band 305 regardless of the band on which the corresponding downlink data channel is transmitted. That is, the uplink acknowledgement channel has to be transmitted on one uplink band (PCell). This is to reduce power consumption of the UE and mitigate inter-cell interference.

Since the legacy system is designed in such a way that one eNB operates on the plural frequency bands 305 and 303 both configured in TDD and manages the cells corresponding to the respective bands, it is always possible to transmit the uplink control channel to the PCell or one eNB.

However, the system depicted in FIG. 1 is the case where the eNBs operating on the frequency bands 305 and 303 are separated physically, and the frequency band 305 operates in FDD while the frequency band 303 operates in TDD. If it is assumed that the two eNBs are connected through a slow communication link which make in difficult to exchange control channel information in real time or quickly, and if the control channels are transmitted at high transmit power through narrow bandwidths, this causes an intermodulation effect which generates significant interference to frequency bands not used by the system, resulting in interference to the operation of other systems.

In order to solve this problem, the present invention provides a transmission method that is capable of avoiding intermodulation interference by preventing the UE from simultaneously transmitting uplink signals while improving the peak downlink data rate.

According to an embodiment of the present invention, a primary eNB operates on a first downlink band and a first uplink band, a secondary eNB operates on a second TDD band, and a UE receives a downlink signal at a downlink subframe on the first downlink band and the second TDD band and transmits an uplink signal at an uplink subframe on the first uplink band and the second TDD band.

In the first approach for the eNB to inform the UE of the first and second resources, the primary eNB informs the UE of the first resource and the secondary eNB informs the UE of the second resource. The first resource is a set of subframes on the first uplink band capable of being used for transmission to the primary eNB. The second resource is a set of the subframes on the second uplink band capable of being used for transmission to the secondary eNB. According to an embodiment of the present invention, the first and second resources are not overlapped on the time axis.

In another approach, the UE receives TDD configuration information of the secondary eNB from the primary eNB and checks the uplink subframe positions from the TDD configuration information of the secondary eNB to detect the second resource. In this case, the UE checks the downlink subframe positions from the TDD configuration information of the secondary eNB and recognizes the downlink subframes as the first resource. According to an embodiment of the present invention, the second approach is also characterized in that the first and second resources are not overlapped on the time axis.

When transmitting acknowledgement channels corresponding to the downlink data channels scheduled by the primary and secondary eNBs, the UE transmits the acknowledgement channel corresponding to the downlink data channel from the primary eNB on the first resource and the ACK channel corresponding to the downlink data channel from the secondary eNB on the second resource.

The first and second resources denotes subframe indices, and a uplink subframe of each resource carries a set of ACK channels corresponding to the data channels carried in plural downlink subframes. The first and second resources may be arranged in consideration of synchronized transmission of the uplink data channel. The first and second resources are not overlapped on the time axis in general but may be overlapped depending on the locations of the primary and secondary eNBs and distance between the primary and secondary eNBs.

The UE may be allocated the first and second resources through the following two methods. The first method is to allocate, when the UE has connected to the primary eNB, both the first and second resources based on the higher layer signaling of system information of the primary eNB.

In the second method, the UE is allocated the first resource from the primary eNB and the second resource from the secondary eNB through higher layer signaling or system information. That is, the UE may receive signaling from one eNB entirely or respective eNBs depending on whether each eNB can transmit higher layer signaling to the UE.

If the first and second resource information are received from the eNB, the UE uses the first and second resources for transmitting Physical Uplink Control Channel (PUCCH) to the respective eNBs. The ACK to be transmitted to the primary eNB in correspondence to the data channel received on the first downlink band and the information to be transmitted through the control channel are transmitted on the first resource. Meanwhile, the ACK to be transmitted to the secondary eNB in correspondence to the data channel received on the second downlink band and the information to be transmitted through the control channel are transmitted on the second resource.

The format of the control channel that can be transmitted on the first and second resources may be any of PUCCH formats 1/1a/1b, 2/2a/2b/ and 3 depending on the type and amount of the information. Regardless of the type and amount of the information, one or some of the PUCCH formats 1/1a/1b, 2/2a/2b/ and 3 may be designated for information transmission.

The first and second resources may be indicated at non-consecutive subframes and, in this case, the corresponding resources carry the ACK channels corresponding to plural downlink data channels. According to an embodiment of the present invention, assuming two consecutive subframes indicated by the first or second resource are i and j, and the subframe i precedes the subframe j, a number of downlink subframes of which ACKs are to be included in the ACK channel is k (j−i=k) and the subframe indices are j−4 to j−4−k+1.

For example, when the subframe indices indicated by the first resource are 2 and 5, i is 2, j is 5, and k is 3. In this case, the ACK channel resource corresponding to PUCCH carried at subframe j is 5−4=1 to 5−4−3+1=−1, and the UE transmits the ACK channels corresponding to three subframes, i.e. $1^{st}$, $0^{th}$ and $-1^{st}$ subframes.

The first and second resources may be indicated with a bitmap, and the uplink HARQ process number can be indicated in consideration of retransmission of the uplink data channel. The size of bitmap may be 10 bits or 80 bits, indicating 10 msec or 80 msec, respectively, or, in the case of indicating the Hybrid Automatic Repeat reQuest (HARQ) process number, 8 bits.

Using 10 bits is advantageous in that the first and second resource repeats at the fixed subframe positions but disadvantageous in that the uplink data retransmission is not conserved. Using 80 bits is advantageous in that the uplink data retransmission is transmitted at an interval of 8 msec but disadvantageous in that the data amount is large. Using 8 bits indicating HARQ process number is advantageous in that the uplink data retransmission can be considered with small resource.

The first and second resources indicated by the primary and secondary eNBs may be configured according to a resource split rule predetermined by the operator, or the resources may negotiated between the primary and secondary eNBs through inter-eNB communication. In the latter case, the secondary eNB sends the primary eNB its TDD information and recommended second resource and determines the second resource based on the response from the primary eNB. The information exchanged between the eNBs may be identical with the information exchanged through the aforementioned higher layer signaling or corresponding information. A description of the method follows.

The primary and secondary base stations may be determined as the base stations managed by the same base station controller and, this includes that the same base station informs the terminal of the first and second resources.

Figure 4:
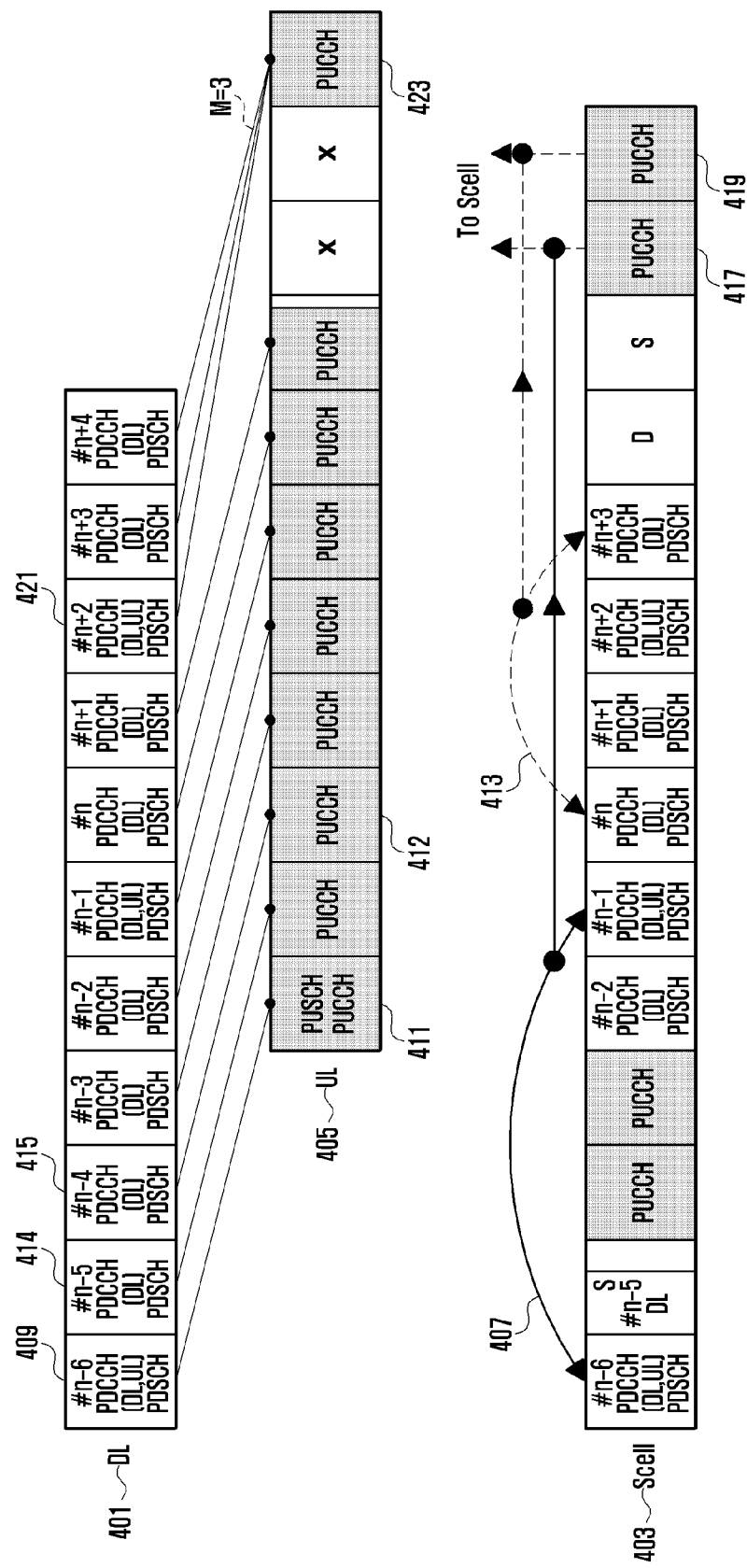
FIG. 4 is a diagram illustrating a downlink-uplink configuration for use in an uplink transmission method according to an embodiment of the present invention.

FIG. 4 is a diagram illustrating a downlink-uplink configuration for use in an uplink transmission method according to an embodiment of the present invention.

An embodiment of the present invention relates to a method for determining the first and second resources and transmitting uplink control channel thereon in the case that the secondary eNBs operate with the same TDD configurations. FIG. 4 is directed to the case where the primary eNB operates on the first downlink band 401 and the first uplink band 405 and the secondary eNB uses the second TDD band 403 for downlink and uplink transmissions. The UE transmits control channels using the first resource 411 of the primary eNB and the second resources 417 and 419 of the secondary eNB.

An embodiment of the present invention is directed to a method for configuring the first resource of the primary eNB to be identical in transmission timing with the downlink subframe resource of the TDD configuration of the secondary eNB. Since the secondary eNB has small uplink resource as compared to the primary eNB, it is a way of maximizing the secondary eNB-related performance to use the uplink resource as much as possible. Also, it is possible to prevent the UE from simultaneously transmitting the control channels to the primary and secondary eNBs by matching the time of the downlink subframe of the secondary eNB to the control channel transmission timing to the primary eNB. In this embodiment, the first resource may include all or some of the downlink subframe positions of the secondary eNB, and the second resource may include all or some of the uplink subframe positions of the secondary eNB.

Referring to FIG. 4, the control channel corresponding to the downlink transmission in the duration 407 is transmitted in uplink subframe 417 and the control channel corresponding to the downlink transmission in the duration 413 is transmitted at uplink subframe 419 according to the control channel transmission timings of the TDD configuration of the secondary eNB, and the subframes 417 and 419 are included in the second resource.

In the case of the primary eNB, the subframes with the exception of the subframes 417 and 419 (i.e. the subframes for use in downlink transmission of the secondary eNB) are configured entirely or partially as the first resource. In this case, the uplink ACK channel corresponding to the downlink transmission at the subframes 409 and 415 are transmitted at subframes 411 and 412 on the second uplink band. In the case that the uplink control channel cannot be transmitted at some subframes of the primary eNB on the second resource position as the subframe 421, the ACK channel corresponding to the downlink data channel may be transmitted on the first resource right after the second resource position as the subframe 423. At this time, the control channels that have not been transmitted may be transmitted. FIG. 4 is directed to the case where total 3 downlink subframes are aggregated for transmission.

Figure 5:
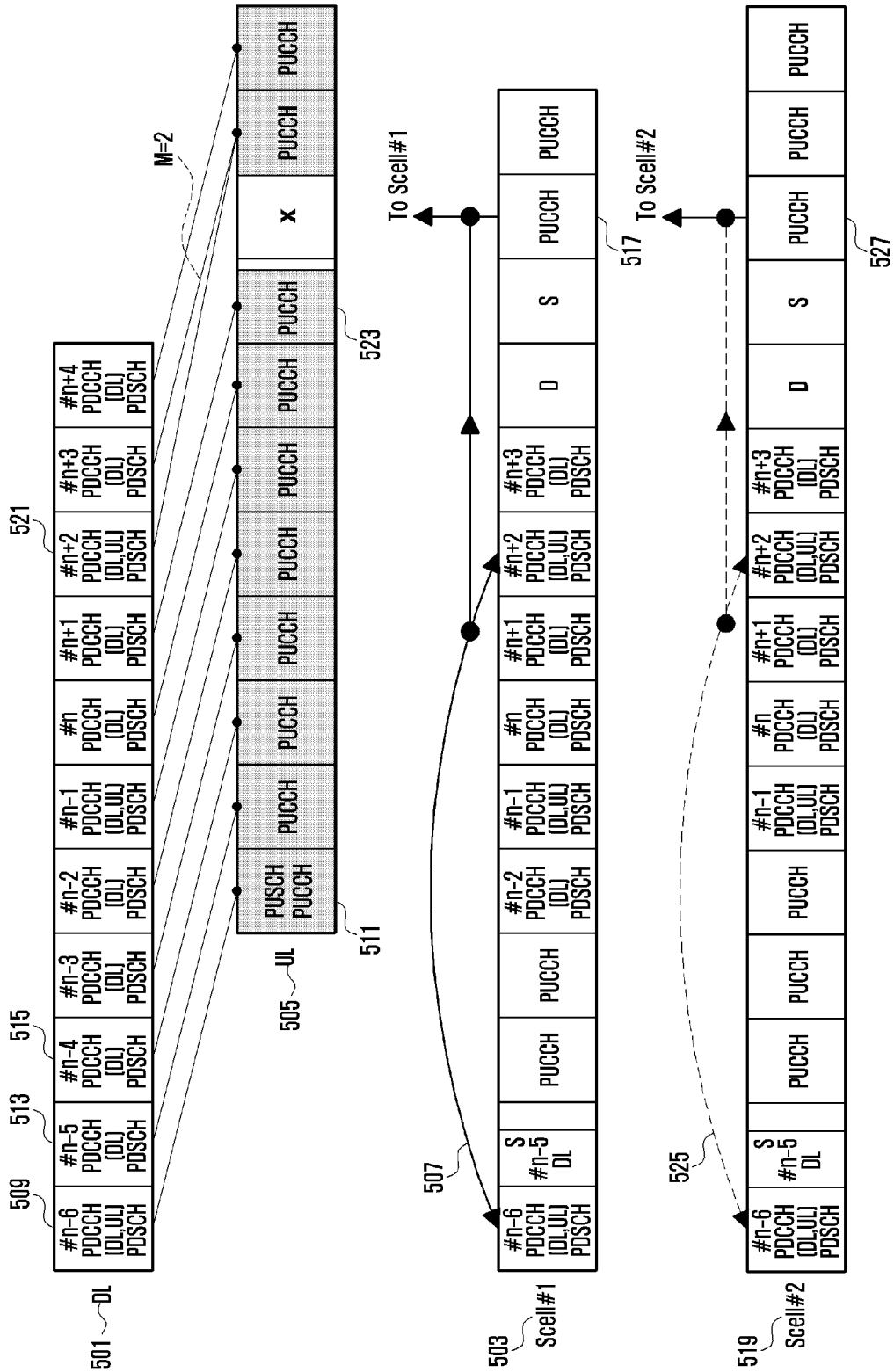
FIG. 5 is a diagram illustrating a downlink-uplink configuration for use in an uplink transmission method according to an embodiment of the present invention.

FIG. 5 is a diagram illustrating a downlink-uplink configuration for use in an uplink transmission method according to an embodiment of the present invention.

An embodiment of the present invention relates to a method for determining the first and second resources and transmitting uplink control channel thereon in the case that the secondary eNBs operate with different TDD configurations.

Referring to FIG. 5, the primary eNB uses the first downlink band 501 and the first uplink band 505, and plural secondary eNBs within the cell use the second TDD band 503. The frequency band 503 is the second TDD band used by one secondary eNB, the frequency band 519 is the second TDD band used by another secondary eNB, and the frequency bands 503 and 519 are identical with each other.

An embodiment of the present invention is directed to a method in which the second resource used by the secondary eNB uses a third TDD configuration information other than the TDD configuration information used by the secondary eNB, and the first resource used by the primary eNB is configured with the time for transmitting the downlink subframe resource or a part thereof in the third TDD configuration information. In the case that plural pico cells exist in the cell, the primary eNB receives different TDD configuration information from the secondary eNBs and thus cannot use the TDD configuration information of the secondary eNBs. In this case, the primary and secondary eNBs share specific configuration information other than the TDD configuration information of the secondary eNBs to determine the uplink ACK channel transmission timing and the second resource based on the specific configuration information. Also, the first resource location of the primary eNB is determined based on this.

Referring to FIG. 5, the frequency band 503 operates with the TDD configuration of a secondary eNB, and the frequency band 519 operates with the TDD configuration of another secondary eNB. The two TDD configurations have different uplink transmission positions. In this case, the primary eNB is aware of the different TDD configurations of the secondary eNBs and thus it is difficult to determine the first resource. Accordingly, the secondary eNB receives the uplink ACK channel only at subframes 517 and 527 according to a third TDD configuration. The primary eNB is capable of determining the first resource such as subframe 523 based on the third configuration other than the TDD configuration used by the secondary eNBs so as to secure more uplink resources.

Similar to the previous embodiment, if the uplink control channel is not transmitted at some subframe of the primary eNB on the second resource position as the subframe 521, the ACK channel corresponding to the downlink data channel may be transmitted on the first resource position right after the second resource position. At this time, the control channels that have not been transmitted may be transmitted at a time.

Figure 6:
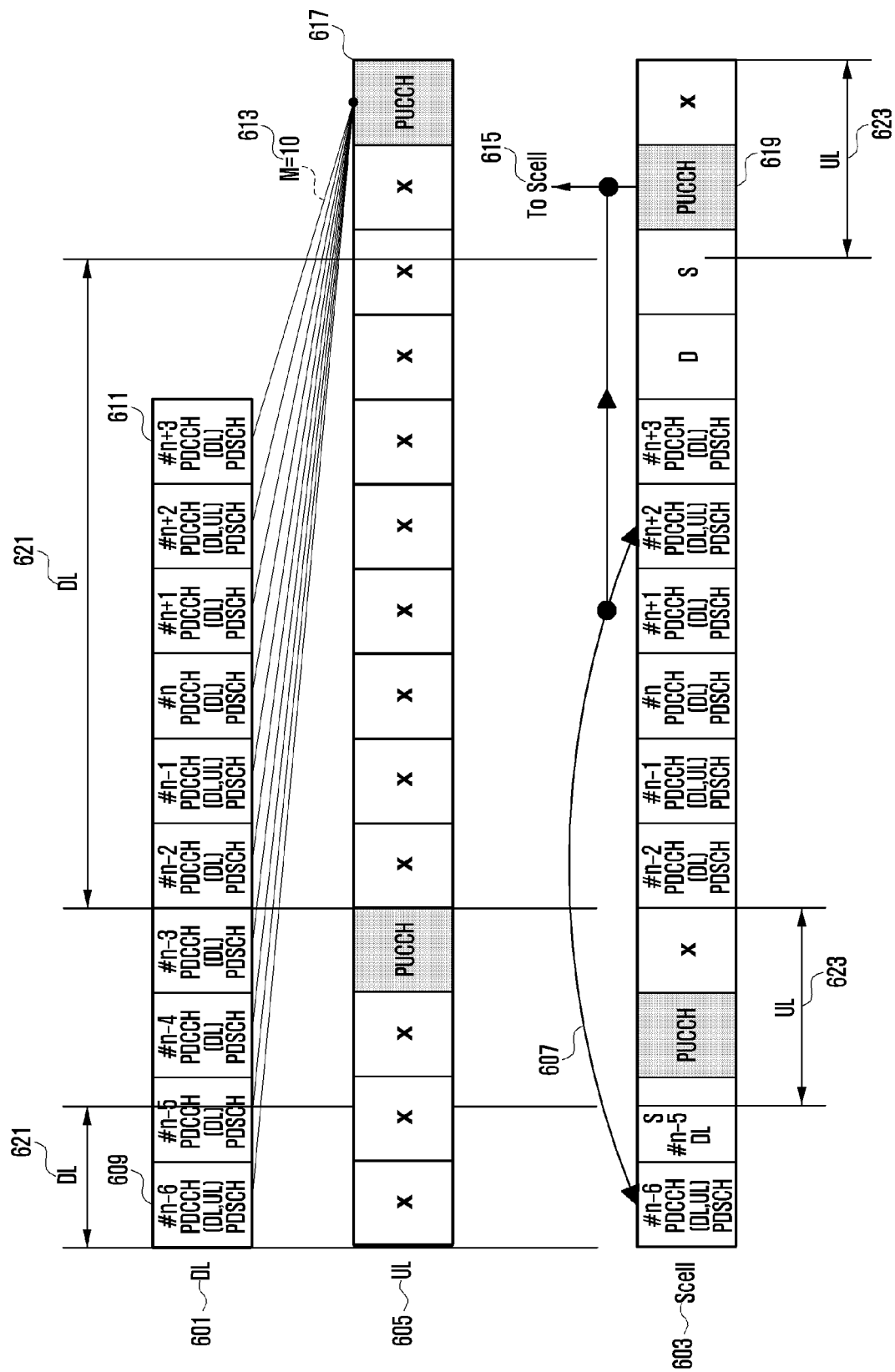
FIG. 6 is a diagram illustrating a downlink-uplink configuration for use in an uplink transmission method according to an embodiment of the present invention.

FIG. 6 is a diagram illustrating a downlink-uplink configuration for use in an uplink transmission method according to an embodiment of the present invention.

An embodiment of the present invention is directed to a method for configuring the first and second resources in the case that the UE is configured to operate in half duplex mode. When the UE is configured to operate in half duplex mode, the UE cannot perform transmission and reception simultaneously. In an embodiment of the present invention, the terminal is configured to receive signal in the duration 621 and transmit signal in the duration 623 and this is determined based on the TDD configuration of the secondary eNB. In order to avoid simultaneous uplink transmissions to the first and second eNBs, the uplink transmission region of the duration 623 is split into the first and second resources.

FIG. 6 is directed to the case where the primary eNB use the first downlink band 601 and the first uplink band 605 and the secondary eNB use the second TDD band 603 for downlink and uplink transmissions. The UE transmits the control channel on the first resource 617 of the primary eNB and the second resource 619 of the secondary eNB.

Unlike the previous two embodiments, the downlink resources used by the secondary eNBs cannot be used for uplink in this embodiment. This is because the UE is configured to operate in half duplex mode and the resource configured as the second resource in the first embodiment should be split to the resources for the primary and secondary eNBs. Accordingly, some subframes are used as the first resource and the others as the second resource without overlap. In this configuration, the control channel addressed to the primary eNB has to carry the ACK channels corresponding to may downlink data channel as the subframe 617. FIG. 6 shows the case of transmitting the control channel corresponding to total ten downlink data transmissions at the subframe 617.

When the signals transmitted by the terminal using the first and second resources are addressed to different base stations, the transmit powers used by the first and second resources may be transmitted with different power control information in consideration of the case where the interference levels of the first and second resources differ from each other, and the terminal may adjust the transmit powers of the first and second resources based on the power commands determined distinctly according to the subframes carrying the corresponding scheduling information.

Figure 7:
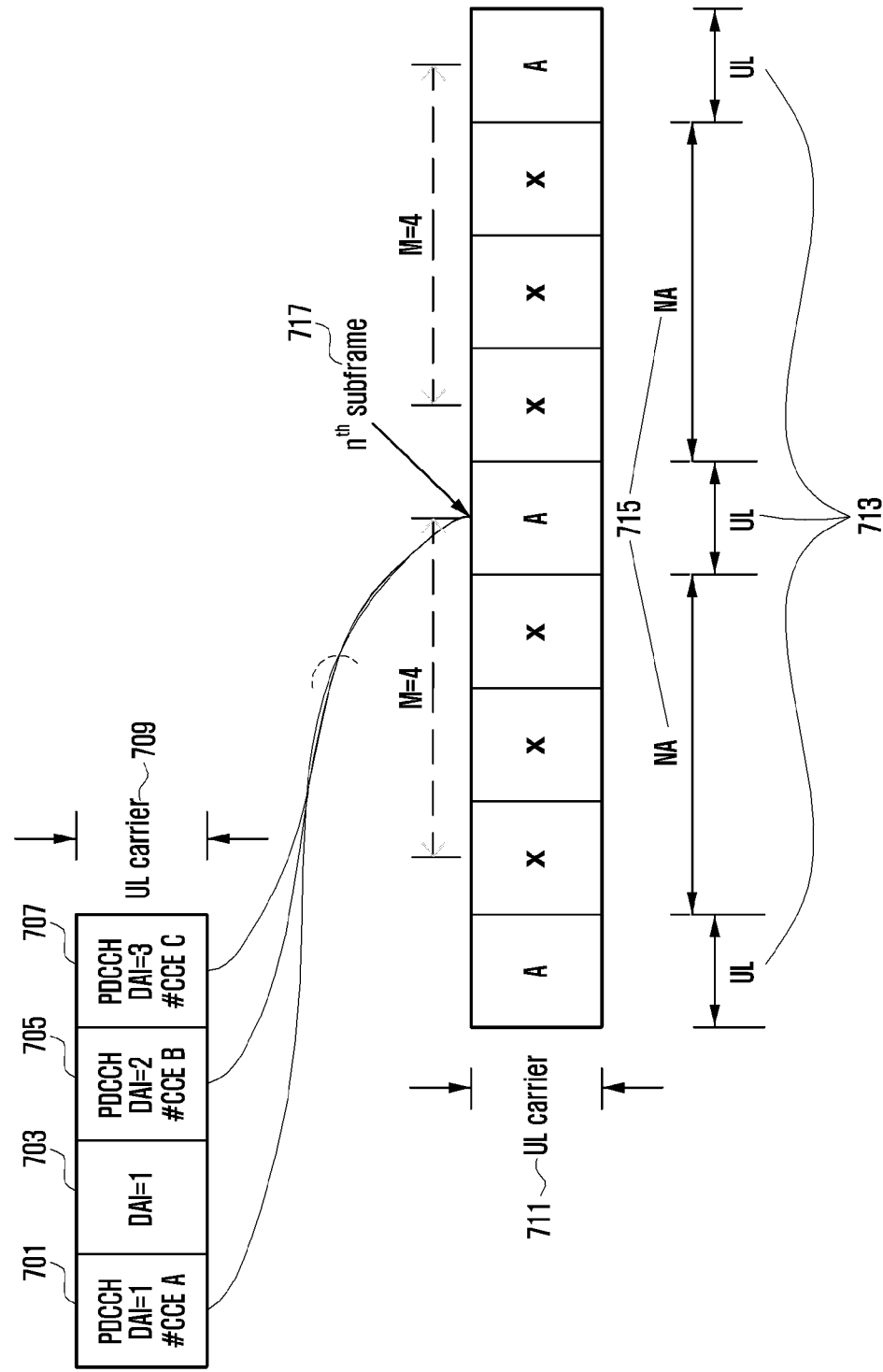
FIG. 7 is a diagram illustrating a mechanism for transmitting control channels in an uplink transmission method according to an embodiment of the present invention.

FIG. 7 is a diagram illustrating a mechanism of transmitting control channel in an uplink transmission method according to an embodiment of the present invention.

An embodiment of the present invention is directed to a method for determining a number of control channels multiplexed into uplink ACK channel transmission based on the number of downlink subframes in the case where the ACKs corresponding to plural downlink subframes are transmitted in one uplink subframe.

Referring to FIG. 7, if the UE acquires the information on the first resource 713 and the second resource 715 and is scheduled on the first resource 713 or the second resource 715 of one downlink band 709 of the first downlink band and second TDD band, the ACKs corresponding to plural downlink subframes are transmitted at the control channel transmission timing as the subframe 717.

Although the eNB has transmitted the downlink scheduling information at subframes 701, 703, 705, and 707, if it fails demodulating the control channel, the UE does not know whether there is actual transmission. Accordingly, the control channel transmission resource amount, at the subframe 717, assumed by the UE and the control channel transmission resource amount assumed by the eNB may differ from each other.

Accordingly, the eNB may indicate the number of control channels to be transmitted using a Downlink Allocation Indicator (DAI) added in the control channel. For example, if the control channel is transmitted first at subframe 701 but no control channel at subframe 703, the eNB sets DAI of the control channel at subframe 701 to 1 and determines DAI=1 at subframe 703.

If there is any control channel added to subframes 705 and 707, the DAI is set to 2 at subframe 705 and 3 at subframe 707 depending on the number of added control channels. The DAI may be configured to indicate the number of control channels transmitted actually. Also, the DAI may be configured to indicate a corresponding representative value. For example, the DAI is set to 0 for occurrence of one control channel, 1 for occurrence of two control channels, 2 for occurrence of three control channels, and 3 for occurrence of four control channels. Also, the DAI may be set to 0 for occurrence of even-numbered control channels and 1 for occurrence odd-numbered control channels with 2 bits.

Figure 8:
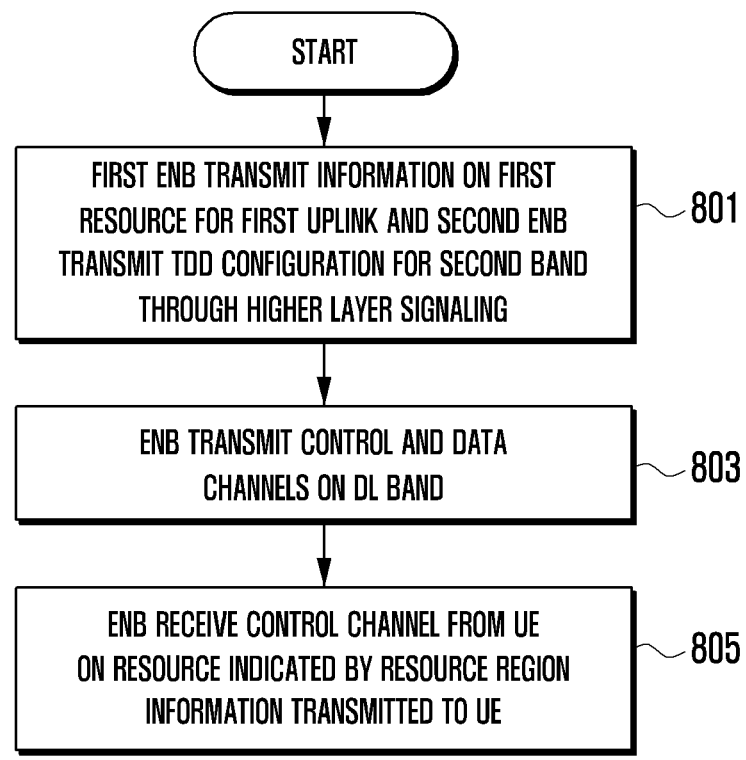
FIG. 8 is a flowchart illustrating an eNB procedure for uplink transmission according to an embodiment of the present invention.

FIG. 8 is a flowchart illustrating an eNB procedure of an uplink transmission method according to an embodiment of the present invention.

The primary and secondary eNBs sends the UE the first and second resource information as the transmission information on the first uplink band and second TDD band at step 801. Next, the primary and secondary eNBs transmit scheduling information on the first and second downlinks respectively at step 803. The first eNB may transmit both the first and second resource information. In this case, the UE connects to the primary eNB first and acquires the first and second resources information in the process of connecting to the secondary eNB. The first and second resources may also be determined based on the TDD configuration of the secondary eNB which is informed by the primary eNB or the secondary eNB.

Afterward, the primary eNB receives its uplink control channel on the first resource and the secondary eNB receives its uplink control channel on the second resource at step 805. The received control channel includes the uplink ACK corresponding to a predetermined number of downlink data transmissions.

Figure 9:
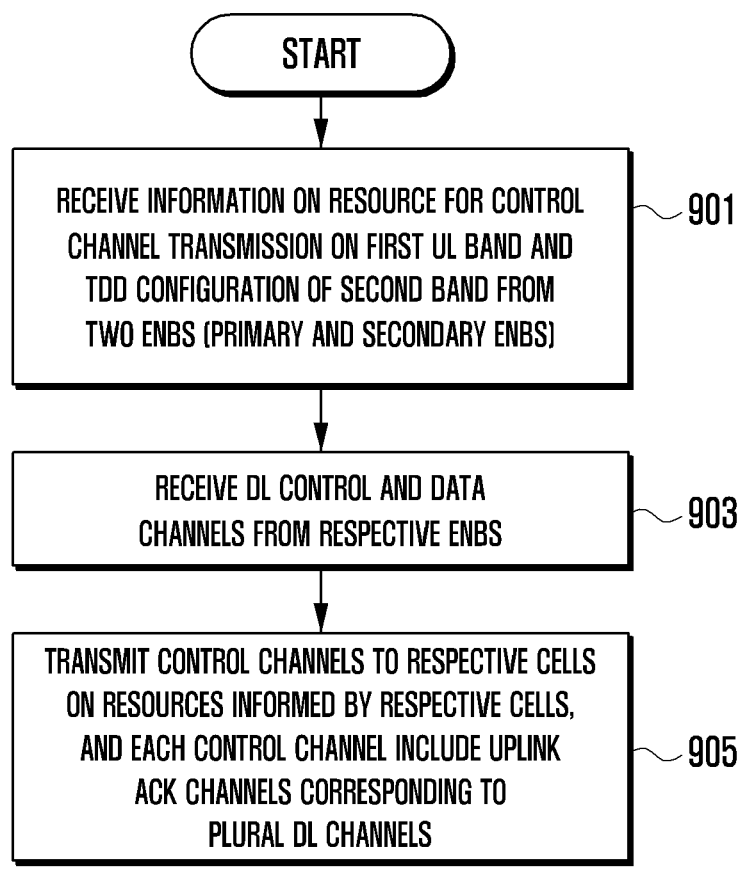
FIG. 9 is a flowchart illustrating an UE procedure for uplink transmission according to an embodiment of the present invention.

FIG. 9 is a flowchart illustrating the UE procedure of an uplink transmission method according to an embodiment of the present invention.

The UE receives the information on the first resource of the first uplink band from the primary eNB and the information on the second resource of the second uplink band from the secondary eNB at step 901. As described above, the information on the first and second resources may be received from the primary eNB or secondary eNB, or acquired based on the TDD configuration of the second eNB.

Next, the UE receives the control and data channels on the first and second downlink bands transmitted by respective eNBs and transmits data channels on the first and second uplink bands based on the control channels at step 903.

Finally, when transmitting control channels at uplink subframes of the first uplink band and second TDD band, the UE transmits the uplink control channels to the primary eNB on the first resource and the secondary eNB on the second resource at step 905, the control channels carrying the ACKs corresponding to the data channels transmitted in the plural downlink subframes.

Figure 10:
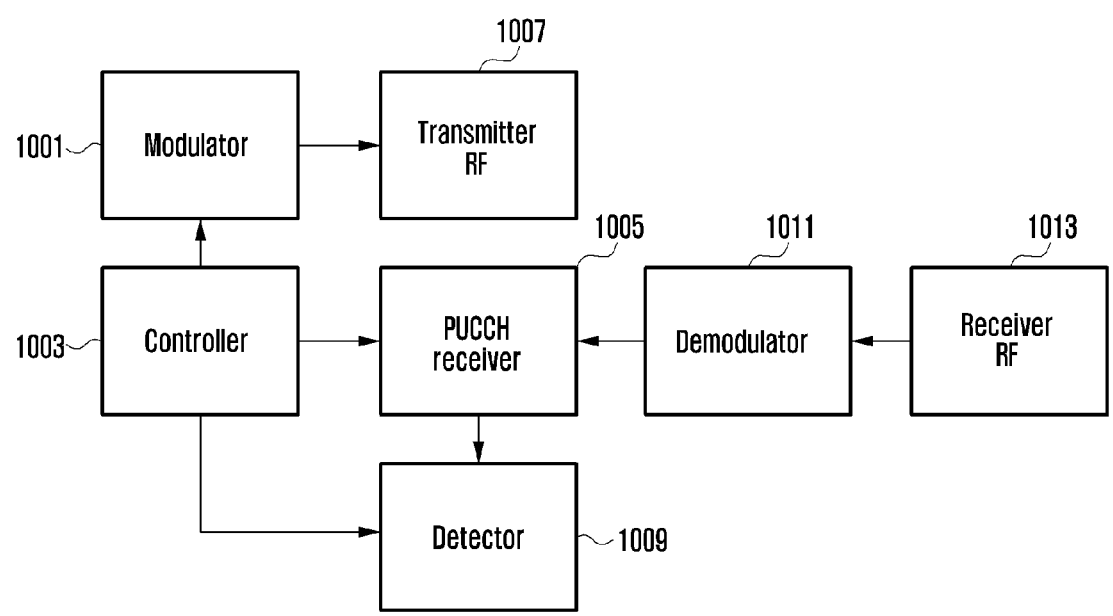
FIG. 10 is a block diagram illustrating a configuration of the eNB for receiving uplink signals according to an embodiment of the present invention.

FIG. 10 is a block diagram illustrating a configuration of the eNB for receiving uplink signals according to an embodiment of the present invention.

Referring to FIG. 10, the controller 1003 controls the transmission of the control and data channels modulated by means of the modulator 1001 to the UE through the transmitter 1007. The controller 1003 also configures the resource region for uplink transmission of the UE and transmits the configuration information by means of the modulator 1001 and the transmitter 1007.

The eNB activates the receiver 1013 at the time informed to the UE and controls the PUCCH control channel receiver 1005 to receive the control channel transmitted by the UE, the demodulator 1011 to demodulate the signal received from the UE, and the detector 1009 to detect the control channel. The detector 1009 checks the resource information and amount of the control channel based on the information from the controller 1003.

An eNB configured as shown in FIG. 10 is capable of performing the method according to an embodiment of the present invention.

Figure 11:
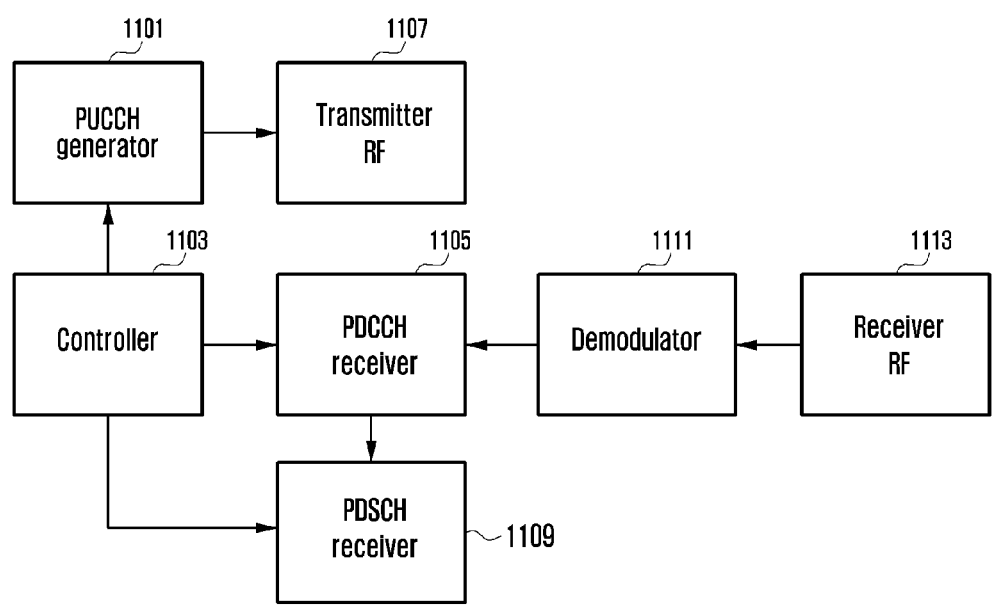
FIG. 11 is a block diagram illustrating a configuration of the UE for transmitting uplink signals according to an embodiment of the present invention.

FIG. 11 is a block diagram illustrating a configuration of the UE for transmitting uplink signals according to an embodiment of the present invention.

The controller 1103 receives a signal by means of the receiver 1113, demodulates the received signal by means of the demodulator 1111 and checks the scheduling information from the demodulated signal by means of the PDCCH control channel receiver 1105. The controller 1103 receives the resource information to be transmitted on the uplink channel by the receiver 1113 and receives data channel by means of the data channel receiver 1109 based on the control channel received by means of the PDCCH control channel receiver 1105.

The controller 1103 determines uplink ACK channel transmission timing and the resource amount of the ACK channel based on the control channel information received by means of the PDCCH control channel receiver 1105. The control channel is configured by the PUCCH control channel generator 1101 and transmitted to the eNB by means of the transmitter 1107.

As described above, the method and apparatus of the present invention is capable of avoiding intermodulation interference between different frequency bands and allowing the terminal to transmit uplink control channels and receive downlink control channels on the different bands simultaneously so as to improve the peak data rate of the terminal.

Although the description has been made with reference to particular embodiments, the present invention can be implemented with various modifications without departing from the scope of the present invention. Thus, the present invention is not limited to the particular embodiments disclosed herein, but rather includes everything falling within the scope of the following claims and their equivalents.

What is claimed is:

1. A method for a terminal to transmit uplink channels in a wireless communication system, the method comprising:
receiving, from a first cell, information on a first resource for a first uplink control channel and a second resource for a second uplink control channel by higher layer signaling, the first uplink control channel corresponding to a first feedback information for a first downlink channel and the second uplink control channel corresponding to a second feedback information for a second downlink channel;
receiving the first downlink channel and the second downlink channel; and
transmitting the first uplink control channel corresponding to the first downlink channel on the first resource and the second uplink control channel corresponding to the second downlink channel on the second resource,
wherein the first uplink control channel is for the first cell and the second uplink control channel is for a second cell,
wherein the first cell is a primary cell and the second cell is a secondary cell, and
wherein the first resource is on the first cell and the second resource is on the second cell.

2. The method of claim 1, wherein the first resource comprises subframes indicated by subframe indices of all or some of the subframes used in transmitting the second downlink channel.

3. The method of claim 1, further comprising receiving Time Division Duplexing (TDD) configuration information from the second cell.

4. The method of claim 1, wherein the first uplink control channel is used for transmitting an acknowledgement for the first downlink channel and the second uplink control channel is used for transmitting an acknowledgement for the second downlink channel.

5. The method of claim 1, wherein the first downlink channel is received from the first cell, and wherein the second downlink channel is received from the second cell.

6. A terminal for transmitting an uplink channel to a base station in a wireless communication system, the terminal comprising:
a transceiver configured to transmit and receive signals to and from a first cell and a second cell; and
a controller configured to control reception, from a first cell, of information on a first resource for a first uplink control channel and a second resource for a second uplink control channel by higher layer signaling, reception of a first downlink channel and a second downlink channel, and transmission of the first uplink control channel corresponding to the first downlink channel on the first resource and the second uplink control channel corresponding to the second downlink channel on the second resource,
wherein the first uplink control channel is for the first cell and the second uplink control channel is for the second cell,
wherein the first cell is a primary cell and the second cell is a secondary cell,
wherein the first resource is on the first cell and the second resource is on the second cell, and
wherein the first uplink control channel corresponds to a first feedback information for the first downlink channel and the second uplink control channel corresponds to a second feedback information for the second downlink channel.

7. The terminal of claim 6, wherein the controller is further configured to control reception of Time Division Duplexing (TDD) configuration information from the second cell.

8. The terminal of claim 6, wherein the first uplink control channel is used for transmitting an acknowledgement for the first downlink channel and the second uplink control channel is used for transmitting an acknowledgement for the second downlink channel.

9. The terminal of claim 6, wherein the first downlink channel is received from the first cell, and
wherein the second downlink channel is received from the second cell.

10. A method for receiving an uplink channel in a wireless communication system, the method comprising:
transmitting information on a first resource for a first uplink control channel and a second resource for a second control uplink channel by higher layer signaling, the first uplink control channel corresponding to a first feedback information for a first downlink channel and the second uplink control channel corresponding to a second feedback information for a second downlink channel;
transmitting the first downlink channel; and
receiving the first uplink control channel corresponding to the first downlink channel on the first resource,
wherein the first uplink control channel is for a first cell and the second uplink control channel is for a second cell,
wherein the second uplink control channel corresponds to the second downlink channel,
wherein the first cell is a primary cell and the second cell is a secondary cell, and
wherein the first resource is on the first cell and the second resource is on the second cell.

11. The method of claim 10, wherein the second downlink channel is transmitted from the second cell.

12. The method of claim 10, wherein the first uplink control channel is used for transmitting an acknowledgement for the first downlink channel and the second uplink control channel is used for transmitting an acknowledgement for the second downlink channel.

13. An apparatus for receiving an uplink channel in a wireless communication system, the apparatus comprising:
a transceiver configured to transmit and receive signals; and
a controller configured to control transmission of information on a first resource for a first uplink control channel and a second resource for a second uplink control channel by higher layer signaling, transmission of a first downlink channel, and reception of the first uplink control channel corresponding to the first downlink channel on the first resource,
wherein the first uplink control channel is for a first cell and the second uplink control channel is for a second cell,
wherein the second uplink control channel corresponds to a second downlink channel,
wherein the first cell is a primary cell and the second cell is a secondary cell,
wherein the first resource is on the first cell and the second resource is on the second cell, and
wherein the first uplink control channel corresponds to a first feedback information for the first downlink channel and the second uplink control channel corresponds to a second feedback information for the second downlink channel.

14. The apparatus of claim 13, wherein the second downlink channel is transmitted from the second cell.

15. The apparatus of claim 13, wherein the first uplink control channel is used for transmitting an acknowledgement for the first downlink channel and the second uplink control channel is used for transmitting an acknowledgement for the second downlink channel.

* * * * *